United States Patent [19]
Tsykalov et al.

[11] Patent Number: 5,881,178
[45] Date of Patent: Mar. 9, 1999

[54] APPARATUS AND METHOD FOR ACCELERATING THE PROCESSING OF DATA MATRICES

[75] Inventors: Eugene N. Tsykalov, Narberth; James Kirby Smith, Philadelphia, both of Pa.

[73] Assignee: Image Resource Technologies, Inc., Philadelphia, Pa.

[21] Appl. No.: 737,949

[22] PCT Filed: May 22, 1995

[86] PCT No.: PCT/US95/06026

§ 371 Date: Nov. 20, 1996

§ 102(e) Date: Nov. 20, 1996

[87] PCT Pub. No.: WO95/32484

PCT Pub. Date: Nov. 30, 1995

Related U.S. Application Data

[63] Continuation-in-part of Ser. No. 246,849, May 20, 1994, abandoned.

[51] Int. Cl.[6] .............................. G06K 9/40; G06T 5/00
[52] U.S. Cl. ........................ 382/260; 382/279; 382/275; 348/241
[58] Field of Search ................................. 382/260, 264, 382/254, 275, 279, 265; 364/724.12, 724.01, 728.01; 348/241, 607

[56] References Cited

U.S. PATENT DOCUMENTS 4,330,833  5/1982  Pratt et al. ............................. 382/265

*Primary Examiner*—Scott Rogers
*Attorney, Agent, or Firm*—Schnader Harrison Segal & Lewis LLP; David A. Sasso

[57] ABSTRACT

A system is provided for processing matrices of data on an accelerted basis by iterative procedures that significantly reduce the number of steps required to access, move and computationally process the data, achieving significant improvements in operational efficiency. Such acceleration is applicable to, and useful in conjunction with assembly of the data, in performing both spatial filtration and temporal filtration (24) of the assembled data, and in processing the data, once acquired. In general, this is accomplished through optimization of the procedures (i.e. routines) used to handle the data so that significant increases in signal-to-noise ratio and overall processing speed are achieved. Such optimization is accomplished by replacing procedurally intensive routines (in terms of memory movements and computational steps) with more efficient routines for achieving a similar result.

38 Claims, 4 Drawing Sheets

| COMPANY | DATA TRANSLATION† | MATROX† | DATACUBE† | IRT | IRT |
|---|---|---|---|---|---|
| PRODUCT | DT2867 | Magic | MaxVideo 200 | 501MM | 1001MD |
| FRAME AVERAGING | 33msec | ~77msec | <15msec | 33msec | <15msec |
| 3X3 CONVOLUTION | <70msec | 500msec | <15msec | 33msec | <15msec |
| 7X7 CONVOLUTION | ~0.35sec | ~2.5sec | <15msec | 33msec | <15msec |
| 11X11 CONVOLUTION | ~0.7sec | ~5sec | >33msec | 33msec | <15msec |
| INTENSITY LEVELS | 8 | 8 | 8 | 16* | 16* |
| APPROX. RELATIVE COST | 100% | 50% | 1000% | 20% | 100% |
| IMPLEMENTATION | HARDWARE/SOFTWARE | SOFTWARE | HARDWARE | SOFTWARE | HARDWARE |

* DENOTES APPROXIMATE INTENSITY ENHANCEMENT
† DATA DERIVED FROM MANFACTURER'S SPECIFICATIONS

*FIG. 4*

APPARATUS AND METHOD FOR ACCELERATING THE PROCESSING OF DATA MATRICES

This application claims priority under 35 U.S.C. 119 under copending International Application No. PCT/US95/06026, filed on May 22, 1995 and which designated the U.S., which International Application was a continuation-in-part of U.S. application Ser. No. 08/246,849, filed on May 20, 1994 (now abandoned).

BACKGROUND OF THE INVENTION

The present invention relates generally to the processing of data matrices of various kinds, including the processing of data matrices to perform any of a variety of practical applications.

To implement any of a variety of practical applications, matrices of assembled data must be processed on an ongoing basis. For the purpose of the discussion which is to follow, a data-receiving "matrix" is defined to include any established array for receiving data input from an appropriate source, either for storage in memory or for further processing. Primarily, the improvements of the present invention will be discussed in conjunction with the processing of video images in matrix form. However, it is to be understood that other matrices that are similarly handled will equally benefit from, and should be considered part of the improvements of the present invention.

In assembling such images, signals are conventionally derived from an appropriate transducer (e.g., a CCD, infra-red or other camera) and the acquired images are converted to matrices of data which are generally defined as a regular array of points or elements (i.e., pixels). Some form of processing is then required to display the acquired images in a format that is useful to a particular endeavor. Traditionally, this requires significant amounts of memory, to store the acquired images so that they can be processed, as well as a significant amount of processing (including accessing, moving and manipulating the data), to yield perceptible images useful in conveying the information that is desired. As an example, an image displayed on a relatively basic black-and-white monitor can be represented as a matrix consisting of 10,240 (128×80) pixels, where each pixel can exhibit one of 256 available brightness levels. Additional complexity can result when using larger matrices, or an increased number of brightness levels (or representations of color).

An intrinsic part of images acquired with available equipment is a certain degree of "noise" (i.e., a spurious signal in the image being processed). As the intensity (brightness) of an image diminishes, such noise can take on significance relative to the useful image to be acquired. The sensitivity of the resulting system, i.e., its ability to differentiate between signal and noise, therefore becomes an important and often limiting factor. A variety of steps have therefore been taken to increase the sensitivity of available image acquisition systems by increasing the ratio of the received signal to the background noise (i.e., the signal-to-noise ratio). The result is an improved image, for purposes of analysis and display, but usually at the cost of capacity (either memory and/or time).

To improve sensitivity, it is common practice to digitally process the images that are acquired, to improve their signal-to-noise ratio. This is accomplished by performing various mathematical operations on each pixel of each acquired image. Generally speaking, two such methods are employed including spatial filtration and temporal filtration. Spatial filtration is accomplished by replacing each pixel with a mean value derived from a selected number of adjacent (nearest) elements of the defined matrix. Temporal filtration is accomplished by replacing each pixel with a time average derived for a given pixel (with the same coordinates). In either case, the averaging that is performed operates to preserve data and reduce the effects of noise, increasing the system's signal-to-noise ratio, and accordingly, increasing the system's sensitivity.

However, as previously indicated, such processing is subject to limitation in terms of memory (including both storage and movements of the acquired data) and the amount of time that is required to perform the averaging that is necessary (including a variety of mathematical operations). As the number of sampling points (N) increases, in order to increase the sensitivity of the system, the number of processing steps required to access, move and computationally process the data rapidly becomes prohibitive. Often, this constitutes a limiting factor in the processing of such matrices of data.

For this reason, and as practical applications became more and more demanding, the systems developed to accommodate such data became correspondingly complex, both in terms of their size and their dedicated processing capabilities. This has proceeded to the extent that present demands can often limit desirable applications to all but the most complex, and therefore expensive, of apparatus. The alternative was often a sacrifice in either speed or sensitivity, and at times in both. As a result, many applications became prohibitive in terms of equipment and cost, limiting their potential for broad-based use. In some cases, this even prevented potentially useful applications from being implemented on any reasonable scale. It therefore remained to devise a system less subject to such limitations.

SUMMARY OF THE INVENTION

It is therefore the primary object of the present invention to provide an improved system for processing matrices of data.

It is also an object of the present invention to provide an improved system for processing matrices of data in a reduced amount of time and with a reduced number of operations.

It is also an object of the present invention to provide an improved system for processing matrices of data in real time.

It is also an object of the present invention to provide an improved system for processing matrices of data with increased sensitivity.

It is also an object of the present invention to provide a system for processing matrices of data with improved sensitivity and in real time making use of conventionally available equipment, thereby avoiding the need for relatively expensive, special-purpose equipment.

It is also an object of the present invention to provide a system for processing matrices of data with improved sensitivity and in real time which can be implemented in software, for use in conjunction with general purpose computing equipment.

It is also an object of the present invention to apply an improved system for processing matrices of data with increased sensitivity and in real time to various applications which would benefit from such improvements, to achieve end results which exhibit improved characteristics capable of facilitating their use by practitioners.

These and other objects which will become apparent are achieved in accordance with the present invention by providing a system for processing matrices of data on an accelerated basis by iterative processes that significantly reduce the number of steps required to access, move and computationally process the data, achieving significant improvements in operational efficiency. Such acceleration is applicable to, and useful in conjunction with, assembly of the data, in performing both spatial filtration and temporal filtration of the assembled data, and in processing the data, once acquired. In general, this is accomplished through optimization of the procedures (i.e., routines) used to handle the data so that significant increases in signal-to-noise ratio and overall processing speed are achieved. Such optimization is accomplished by replacing procedurally intensive routines (in terms of memory movements and computational steps) with more efficient routines for achieving a similar result.

Previously, conventional practice was to separately operate upon each pixel in a matrix, leading to ever-increasing complexity and time dependence. This, in turn, led to the use of more and more sophisticated and complex equipment, to accommodate the correspondingly sophisticated and complex applications involved. Traditionally, this was accomplished using operation-intensive procedures such as Fast Fourier Transforms (FFT) to accommodate matrices of increased size. However, even these measures became less than satisfactory in handling the larger matrices (e.g., a 7×7 matrix or larger), which were in many cases considered to be beyond the practical capabilities of conventional computers.

In accordance with the present invention it has been discovered that such procedurally intensive operations can be replaced with more efficient procedures that rely upon definable relationships between adjacent pixels in a conventional matrix. Surprisingly, it was found that the separate processing of each pixel in a matrix is no longer required. Further, it has been discovered that significant reductions in the amount of time required to access the data, to perform desired movements of the data, and to computationally handle the data, are also achievable by taking advantage of definable relationships between adjacent pixels in a conventional matrix. Surprisingly, it was found that the resulting processes are significantly less subject to the limitations of prior systems, particularly as the number (N) of sampling points to be processed increases beyond that previously considered practicable for available matrix processing systems.

When combined with available equipment for acquiring data, and for assembling the acquired data into useful matrices, it has been found that a number of practical applications become possible. Primarily, this is because the data processing system of the present invention can be used to process complex matrices in real time and with a sensitivity not previously available. As an example, video images assembled in a regular matrix can be processed and displayed in real time, affording opportunities for the utilization of such images which could not have been achieved with prior systems because of their need to buffer the data to permit necessary processing to take place. What is more, by facilitating the processing of larger matrices (of increased complexity and incorporating an increased number (N) of sampling points), significant improvements in sensitivity and signal-to-noise ratio are achieved, enhancing the information derivable from the processed images even though acquired from conventionally available transducers. Any of a number of applications have been found to benefit from the improvements of the present invention, and a number of applications have for the first time been made practicable by the improvements of the present invention.

For further detail regarding the data processing system of the present invention, and an indication of its practical applications, reference is made to the description which is provided below, taken in conjunction with the following illustrations.

BRIEF DESCRIPTION OF THE DRAWINGS

FIG. 4 is a table comparing identified performance parameters for prior data acquisition systems and for data acquisition systems implementing the improvements of the present invention.

DETAILED DESCRIPTION OF PREFERRED EMBODIMENTS

Figure 1:
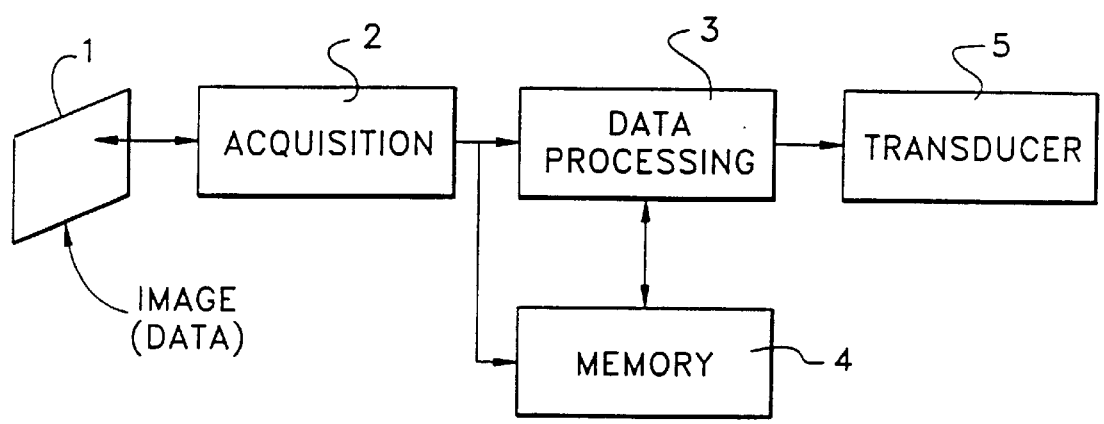
FIG. 1 is a schematic block diagram showing an overall relationship between the acquisition of data and its display in useful form.

In its simplest form, the acquisition of data for useful purposes is schematically illustrated in FIG. 1 of the drawings. Data 1 (in the case illustrated, desired images) is acquired, at 2, and is in turn applied to a data processing system 3. Steps are taken to appropriately process the acquired data, at 3, which can include any of a number of practical operations involved in data acquisition, movements of data to and between various locations, and computational steps necessary toward end processing of the data. As part of this, memory 4 is conventionally provided to store the acquired data, and data derived from the acquired data. A suitable transducer 5 is provided to allow the data to be used to perform useful work.

It is a particularly desirable characteristic of the present invention that operations of the data processing system 3 can be accomplished in real time (i.e., as the operations actually occur), to provide useful data which is not subject to undesirable time delays. In the discussion which is to follow, the improvements of the present invention will primarily be discussed in terms of matrices representative of images suited to appropriate display for practical purposes. While the improvements of the present invention are well suited to such purposes, it is to be understood that the improvements of the present invention will find applicability to the processing of other matrices, and other data formats that can usefully benefit from the accelerated processing and increased sensitivity achievable with the data processing system 3 of the present invention. Practical examples of applications employing the improvements of the present invention will also be provided.

A key factor contributing to the improvements of the present invention is the realization that data in a matrix is related, and that adjacent elements in a matrix can be derived by iterative techniques which no longer require a separate calculation for each element of the matrix. To illustrate this, the following definitions will be used.

I(i)=I(1), I(2), I(3), . . . I(N)=sequence of N values of input data;

V(i)=V(1), V(2), V(3), . . . V(N)=sequence of N values of output data;

F( ..., I(i−1), I(i), I(i+1), ... ) is a data processing function which calculates a value for a processed pixel based on the values of adjacent pixels of input data;

K is a value which represents the efficiency (speed ratio) of the accelerated processing of data in accordance with the present invention in comparison with the processing of data in accordance with conventional techniques, based on a ratio of the number of operations performed; and N is the number of pixels of data to be processed. Applying this to the analysis of a matrix, the output value for a first pixel V(i) employing a defined processing function F( ... ) and based on the values of N adjacent input pixels ( ..., I(i−1), I(i), I(i+1), ... ), can be expressed by the following equation:

$$V(i)=F( \ldots, I(i-2), I(i-1), I(i), I(i+1), I(i+2), \ldots ). \quad (1)$$

Similarly, the output value for the next pixel V(i+1) can be expressed by the following equation:

$$V(i+1)=F( \ldots, I(i-1), I(i), I(i+1), I(i+2), I(i+3), \ldots ). \quad (2)$$

The function F( ... ) of equations (1) and (2) represents any conventional function for data processing. To be noted is that for each output pixel, it is necessary to perform a number of operations determined by the function F( ... ) on N input pixels.

In accordance with the present invention, the value V(i+1) is expressed by the following equation:

$$V(i+1)=V(i)+\Delta V(i), \quad (3)$$

where $\Delta V(i)$ is the difference between (or alternatively, the derivative of) the processed values for the pixels (i+1) and (i). The value of $\Delta V(i)$ can also be expressed from equations (1) and (2), as follows:

$$\Delta V(i)=V(i+1)-V(i)=F( \ldots, I(i+1), \ldots )-F( \ldots, I(i), \ldots ), \quad (4)$$

or:

$\Delta V(i)=\Delta F(i)$, where $$\Delta F(i)=F( \ldots, I(i+1), \ldots )-F( \ldots, I(i), \ldots ). \quad (5)$$

Equation (3) can also be written in the form:

$$V(i+1)=V(i)+\Delta F(i). \quad (6)$$

A comparison between equations (2) and (6), each of which determines the value for the processed output pixel, reveals an important difference in approach. Equation (2) employs a conventional function F( ..., I(i), ... ) to determine the value for the processed output pixel. In accordance with the present invention, equation (6) achieves the same result by employing only a difference, $\Delta F(i)$. As a result, the function of equation (6) offers a simpler and faster way to determine the derivative of a processing function, $\Delta F(i)$, as represented by equation (5). The value for the first pixel must be determined conventionally, to initialize the procedures employed in accordance with the present invention. Thereafter, the values for successive pixels are derived with equation (6), using the value for each previous pixel and the calculated value $\Delta F(i)$ (derived from equation 5) for each successive pixel.

It has been found that for many types of data processing functions, the calculation of $\Delta F(i)$ is simpler and faster than the calculation of F( ... ). It should also be noted that while the processing function F( ... ) is shown as a general means for processing 1-, 2-, 3- or N- dimensional data, the processing function F( ... ) could also be a linear or nonlinear (e.g., statistical) function of input values, if desired.

For different types of functions, the derivative of the processing function will have different meanings. In space or time domains, $\Delta F(i)$ is analogous to spatial or time derivatives of the processing function. For processing functions that are not analytical (and which cannot be represented by a formula, but only by a set of rules), the determination of $\Delta F(i)$ requires different processing procedures (or rules) derived from the processing of adjacent pixels. In any event, an advantage is gained in cases where $\Delta F(i)$ is simpler than F( ... ).

Consider the foregoing in the analysis of a non-weighted running window in a flat kernel matrix. First to be described will be a convolution in one dimension, which corresponds to temporal filtration in a time domain or a spatial convolution in one dimension. As previously indicated, the first step required is to derive the value for a first pixel I(i) in the conventional way. Thereafter, values for the remaining pixels are derived by finding the derivative of the processing function, $\Delta F(i)$, as described above.

As an example, consider the case for five pixels (N=5) in a kernel matrix. For a convolution in one dimension, the appropriate processing function is expressed as:

$$V(i)=1*I(i-2)+1*I(i-1)+1*I(i)+1*I(i+1)+1*I(i+2). \quad (7)$$

This equation represents an output pixel that is averaged over five adjacent pixels, with equal weights, but without a final division by 5 (the advantages of this will be discussed more fully below).

To find $\Delta F(i)$, the kernel matrix coefficients for two sequential output pixels (and their difference) may be expressed in the form of a table, as follows:

TABLE 1

| Index | i − 2 | i − 1 | i | i + 1 | i + 2 | i + 3 |
|---|---|---|---|---|---|---|
| Output Pixel (i) | 1 | 1 | 1 | 1 | 1 | |
| Output Pixel (i + 1) | | 1 | 1 | 1 | 1 | 1 |
| Difference | −1 | 0 | 0 | 0 | 0 | 1 |

Consequently, the derivative of the processing function $\Delta F(i)$ may be expressed as:

$$\Delta F(i)=I(i+3)-I(i-2), \quad (8)$$

and (from equation 6) the value for the subsequent output pixel may be expressed as:

$$V(i+1)=V(i)+I(i+3)-I(i-2). \quad (9)$$

In general, and for any odd number (N) of pixels in a kernel matrix:

$$V(i+1)=V(i)+I(i+n1)-I(i-n2), \quad (10)$$

where n1=N/2+1, and
n2=N/2−1.

From equation (10) it is seen that as a result of the foregoing, only two operations need to be performed for any given N (following the initial value, which must be derived in the conventional way) since all that is required is the addition of the newest pixel value and the subtraction of the oldest pixel value in the averaging window. The number of operations required by such processing does not depend on N, as was previously the case to derive such a result using conventional processing techniques, but rather will always equal 2. Thus, the resulting efficiency (K) of such processing is K=N/2 (i.e., 2 times faster for N=4, 16 times faster for N=, etc.).

Consider next a convolution in tow dimensions, which corresponds to spatial filtration in a two-dimensional space domain. As an example, consider the processing of a two-dimensional convolution with a 3×3 pixel, flat kernel matrix, which can be respresented as follows:

$$\begin{matrix} 1 & 1 & 1 \\ 1 & 1 & 1 \\ 1 & 1 & 1 \end{matrix} \quad (11)$$

The processing of such a matrix requires that every pixel in the array of pixels (e.g., a two-dimensional image) be substituted by an average taken over nine adjacent pixels. For conventional processing, this would require nine averaging operations. However, in accordance with the present invention, the same result can be achieved by first performing a one-dimensional convolution with three elements in the "X" dimension, followed by a one-dimensional convolution on the result of the first operation with three elements in the "Y" dimension.

As a result, the desired two-dimensional convolution can be performed in only two operations, each including two one-dimensional convolutions. What is more, each convolution can be performed in accordance with the present invention, using the previously described equation (10). The number of operations per convolution in each dimension will be two, so that the number of operations per pixel for a two-dimensional convolution will then equal 4, and will not depend on N. In contrast, the number of operations required for conventional processing is N*N. The resulting efficiency (K) of such processing is K=N*N/4 (i.e., 2.25 times faster for N=3, 12.25 times faster for N=7, etc.).

Consider next a convolution in three dimensions, which corresponds to spatial filtration in a three-dimensional space domain. Building on the foregoing, and in accordance with the present invention, a three-dimensional convolution with a flat kernel matrix (of a size N×N×N) can be derived by performing three convolutions, one in each dimension, with each of the successive convolutions taking the result of the immediately preceding convolution as an input (similar to the approach previously described in connection with the two-dimensional convolution). The number of operations per pixel for a three-dimensional convolution will then equal 6 (two operations for each of the three dimensions), and will not depend on N. In contrast, the number of operations required for conventional processing is N*N*N. The resulting efficiency (K) of such processing is K=N*N*N/6 (i.e., 4.5 times faster for N=3, 57.1 times faster for N=7, etc.).

Lastly, consider a convolution in M dimensions, which corresponds to spatial filtration in an M-dimensional space domain. In accordance with the present invention, the convolution of such a flat kernel matrix (of a size N×N×N×. . . ×N; M times) can be derived by performing M one-dimensional convolutions, one in each dimension, with each of the successive convolutions taking the result of the previous convolution as an input. The number of operations per pixel for such a convolution will then be 2*M (two operations for each of the M dimensions), and will not depend on N. In contrast, the number of operations required for conventional processing is N*N*N* . . . *N(M times), or $N^M$. The resulting efficiency (K) of such processing is K=$N^M$/(2*M) (i.e., for M=4, 10.1 times faster for N=3, 78.1 times faster for N=5, etc.).

The foregoing discusses the analysis of a non-weighted running window in a flat kernel matrix. Consider now the analysis of a weighted pyramidal set of coefficients. Again, consider the case for five pixels (N=5) in a kernel matrix. The processing function for a one-dimensional convolution of a weighted pyramidal set of coefficients can be expressed as:

$$V(i)=1*I(i-2)+2*I(i-1)+3*I(i)+2*I(i+1)+1*I(i+2). \quad (12)$$

This equation represents a weighted average (with different weights 1, 2, 3, 2, 1) of each output pixel over five adjacent pixels.

To find ΔF(i), the kernel matrix coefficients for two sequential output pixels (and their difference) may be expressed in the form of a table, as follows:

TABLE 2

| Index | i − 2 | i − 1 | i | i + 1 | i + 2 | i + 3 |
|---|---|---|---|---|---|---|
| Output Pixel (i) | 1 | 2 | 3 | 2 | 1 | |
| Output Pixel (i + 1) | | 1 | 2 | 3 | 2 | 1 |
| Difference | −1 | −1 | −1 | 1 | 1 | 1 |

Consequently, the derivative of the processing function, ΔF(i), may be expressed as:

$$\Delta F(i)=-I(i-2)-I(i-1)-I(i)+I(i+1)+I(i+2)+I(i+3), \quad (13)$$

and the value for the subsequent output pixel may be expressed as:

$$\begin{aligned} V(i+1) &= V(i) - I(i-2) - I(i-1) - I(i) + \\ &\quad I(i+1) + I(i+2) + I(i+3). \end{aligned} \quad (4)$$

To be noted is that all multiplications in such calculations are substituted by summations. This takes advantage of the ability of conventional central processors to perform integer summation up to ten times faster than integer multiplication.

Still further improvements of the foregoing are made possible by considering the difference processing function (equation 14) in two parts, as follows. Since ΔF(i) includes two sets of data pixels with flat matrix coefficients (which corresponds to a convolution of a flat matrix), a first part (I(i+I)+I(i+2)+I(i+3)) can be handled as a one-dimensional convolution (taking two operations as before), and a second part (−I(i−2)−I(i−1)−I(i)) will have previously been calculated (as +I(i−2)+I(i−1)+I(i)) and can therefore be taken as a whole with a change (−) in sign (taking only a single operation). The desired convolution can therefore be expressed as:

$$V(i+1)=V(i)+\text{(calculated one-dimensional flat convolution)}-\text{(result of the previous one-dimensional convolution).} \quad (15)$$

As a result, the total number of operations required to perform equation (15) will equal 4 (two for the one-dimensional convolution with a flat matrix, a subtraction of the previously calculated one-dimensional convolution, and an addition to V(i)). As before, the total number of operations will not depend on N (the size of the convolution matrix), but rather will always equal 4 (for any N). In contrast, the number of operations previously required to derive such a result using conventional processing techniques is 2*N . . . 10*N (depending on the manner in which the multiplication is implemented). Thus, the resulting efficiency (K) of such processing is K=2*N/5 . . . 10*N/5 (i.e., 2 to 10 times faster for N=5).

Consider next a two-dimensional convolution, with five pixels (N=5) in a kernel matrix, of a weighted pyramidal set of coefficients, as follows:

| | | | | |
|---|---|---|---|---|
| 1 | 2 | 3 | 2 | 1 |
| 2 | 4 | 6 | 4 | 2 |
| 3 | 6 | 9 | 6 | 3 |
| 2 | 4 | 6 | 4 | 2 |
| 1 | 2 | 3 | 2 | 1 |

In operation, every pixel in the two-dimensional array of pixels (a two-dimensional image) is substituted by the average taken over 25 adjacent pixels, with appropriate weights. Convolution with a pyramidal set of coefficients is more effective in reducing noise in the signal than is convolution with a flat matrix of the same size. However, the conventional calculations are so computationally intensive that it becomes impracticable for many applications.

In accordance with the present invention, such a convolution can be performed as two one-dimensional convolutions with pyramidal coefficients (1, 2, 3, 2, 1,) in the X and Y directions, with the result of the first convolution being the input for the following convolution. As a result, the total number of operations required for such processing is 8 (four operations in each dimension) and will not depend on N (i.e., the size of the kernel matrix). In contrast, the number of operations required for conventional processing is $2*N^2 \ldots 10*N^2$. The resulting efficiency (K) of such processing is $K=2*N^2/8 \ldots 10*N^2/8$ (i.e., 6.25 to 31.25 times faster for N=5).

To be noted is that any combination of flat and pyramidal sets of coefficients, for one-dimensional, two-dimensional, three-dimensional, or larger matrices, can be similarly processed on an accelerated basis. This is accomplished by reducing the matrix to simpler components and by then performing necessary convolutions on the simpler matrices as previously described (using a prior convolution as an input for the next convolution). As an example, consider the one-dimensional matrix (1 3 4 3 1), which can be reduced to the matrices (1 2 1) and (1 1 1). In each case, the result of a previous convolution is used as the input for the following convolution. For a two-dimensional matrix, such as:

```
1 2 1
2 4 2
1 2 1,
``` analysis can be performed as a sequential convolution of the following matrices:

```
        1
1 2 1 and 2
        1.
```

Such operations are freely repeatable and combinable, as desired, to achieve the matrix analysis that is called for.

Still further improvements are achievable with an adaptive iterative convolution algorithm (AICA), which can be designed to effectively remove white noise from two-dimensional (still and motion) images of any origin. Characteristic of the resultant is the removal of high frequency noise, with the preservation of sharp edges of image structures; and the removal of low frequency noise, with the preservation of gradients of image structures.

The AICA of the present invention is nonlinear and recursive, and is based on the analysis of local image properties. The convolution of the AICA is applied to every pixel in the image, and is based on the conditions ascertained at every pixel. The value obtained may be either changed in a predetermined way, or left unchanged, as desired. Such processing is repeated iteratively, on the whole image, until all or part of the noise is removed (depending on the quality of final image desired). If desired, the adaptive iterative convolution can be modified to a specific purpose including, but not limited to, acceleration, increase in sensitivity, convergence of the recursively processed image, and the like.

Two feature combine to make the AICA of the present invention computationally effective. First, no edge detection is performed to preserve the edges of the image. Detection and preservation of the edges is intrinsic property of the convolution of the AICA, and is done automatically by the processing steps that are applied to each of the pixels of the processed image. Second, the AICA is not based on a calculation of image local rank statistics (ranking and sorting of the all values for pixels surrounding the processed pixel) for the image.

The steps of the AICA are described as follows. First, and for every pixel in the image except for pixels on the boundaries of the image, the value of the pixel to be processed is sequentially compared to the values of all adjacent pixels (e.g., all eight adjacent pixels in a 3×3 matrix). This is illustrated with reference to the following matrix:

```
. . . . . . .
. . 1 2 3 . .
. . 4 i 5 . .
. . 6 7 8 . .
. . . . . . .
```

In the foregoing matrix, dots represent pixels in the two-dimensional image array, indicates the position of the pixel being processed, and the numbers 1–8 show every position of the adjacent pixels involved in processing of the pixel (i). Second, and based on the comparisons made, the following processing steps are performed.

1. If the value in the processed pixel, V(i), is not a maximum, the value is left unchanged and the next step (step 2) is performed. Else, if the value of V(i) is a maximum, step 3 is performed.

2. If the value in the processed pixel, V(i), is not a minimum, the value is left unchanged and processing of the next pixel takes place. If the value V(i) is a minimum, go to step 4.

Summarizing steps 2 and 3, if the value V(i) of the processed pixel is neither a maximum nor a minimum, this value is left unchanged, and processing of the next pixel takes place.

3. If the value V(i) of the processed pixel in step 1 is a maximum (V(i)≧the values for other adjacent pixels), then the following steps 3.1–3.5 are performed:

3.1. subtract from V(i) the value 1 (or, in the general case, the incremental value dV, where dV>0) to provide a new value V(i), i.e., V(i):=V(i)−1;

3.2. compare the new value V(i) for the processed pixel to the values in all the adjacent pixels;

3.3. if the new value V(i) from step 3.1 is still a maximum (V(i)≧the values for other adjacent pixels), then go to step 3.1;

3.4. else, if the new value V(i) from step 3.1 is no longer a maximum (i.e., V(i)<the value of at least one of the adjacent pixels), then save this new value V(i) as the new value V(i) for the processed pixel; and 3.5. proceed to processing the next pixel of the array.

Summarizing steps 3.1–3.5: if the value for the processed pixel is a local maximum, subtract from it repeatedly the value of 1 (or dV, in the general case) until it becomes less than the value in at least one of the adjacent pixels; then save the new value V(i) as the new value V(i) for the processed pixel and process the next pixel.

4. If the value V(i) is a minimum (V(i)≦the values in other adjacent pixels), then the following steps 4.1–4.5 are performed:
   4.1. Add the value 1 to V(i) (or, in the general case, the incremental value dV, where dV>0) to provide a new value V(i), i.e., V(i):=V(i)+1;
   4.2. compare the new value V(i) for the processed pixel to the values in all the adjacent pixels;
   4.3. if the new value V(i) from step 4.1 is still a minimum (V(i)≦the values for other adjacent pixels), then go to step 4.1;
   4.4. else, if the new value V(i) from step 4.1 is no longer a minimum (i.e., V(i)>the value at least in one of the adjacent pixels), then save this new value V(i) as the new value V(i) for the processed pixel; and
   4.5. proceed to processing the next pixel of the array.

Summarizing steps 4.1–4.5: if the value for the processed pixel is a local minimum, add to it repeatedly the value of 1 (or dV, in the general case) until it becomes greater than the value in at least one of the adjacent pixels; then save the new value V(i) as the new value V(i) for the processed pixel and process the next pixel.

5. All pixels of the image (except for pixels at the image boundaries) are processed according to steps 1–4. The resulting image is saved as a current iteration of the processed image.

6. Such iterative processing of the image is repeated until a predetermined criterion is met (e.g., a given number of iterations, quality of the resulting image, amount of processing time, convergence of the image, level of noise achieved, and the like).

Modifications of the above-described AICA may be performed to meet specific needs. For example, the value of dV can be increased if it is desired to accelerate processing during a few initial cycles. This will also tend to increase final noise levels in the processed image. An optimum result can be achieved by dynamically changing dV (e.g., decreasing dV with decreasing levels of noise).

In some cases, the AICA described above will not converge to a final image. Instead, following a finite number of iterations (about n/2 steps, where n=level of noise), the convolution starts to "wash out" useful information from the image (e.g., small amplitude edges). In such cases, appropriate modification will cause the AMCA algorithm to converge. To this end, and prior to applying step 1 described above, if the value V(i) for the processed pixel is equal to the values of all its adjacent pixels, the value V(i) is left unchanged, and the next pixel is processed. In other words, a pixel is "passed," or left unchanged, if the value V(i) is not a maximum and is not a minimum, or if all the values in the adjacent pixels are the same as V(i).

A converging AICA algorithm will produce a slightly different result after convergence is achieved, depending on the total number of iterations (odd or even). To increase the resolution (sensitivity) in processed image, steps can be taken to perform two converging adaptive iterations and to average odd and even iterations of the processed image (thereby preserving the resulting image from odd and even iterations). This process can be repeated a required number of times, each time performing two iterations and an averaging of the two iterations.

Converging AICAs are effective for removing the multiplicative noise (i.e. noise the amplitude of which is proportional to the level of the signal). This is because such convolution automatically stops in areas where noise was removed (converges) and continues to converge in areas where noise is still present.

It has been found that the foregoing improvements in matrix analysis can facilitate a variety of data processing functions. As an example, consider a computer realization for image processing. Generally speaking, such computer realization calls for two main categories of operations including data movements (from memory to central processing unit (CPU) and vice versa) and mathematical operations (additions, subtractions, divisions, multiplications). In accordance with the present invention, it has been found that the processing of dynamic images in real time is made possible through various enhancements useful in the acquisition of improved images which can be processed in a reduced amount of time, while yielding an improved (image processing) end result.

To this end, an imaging route is provided for acquiring images in a reduced amount of time, and with an enhanced result. Conventional image processing calls for convolution involving a summation of values for each point (i.e., pixel) and a division by the number of values that have been summed (i.e., an average). The requisite summation of values can be performed using the above-discussed matrix analyses, leading to significant reductions in necessary processing (both steps and time). It has been found that still further improvement can be achieved by eliminating the final division which was generally considered necessary to prevent the summation from exceeding the range established for the chosen level of processing accuracy. In accordance with the present invention, this final division is eliminated by taking other steps to maintain the summation in an appropriate range. This can be achieved by subtracting the background image from the acquired image, by calculating the time derivative of the sequence of images acquired, or by taking initially low intensity images.

By way of explanation, consider an array comprised of 8-bit images in 256 levels. Conventional processing, involving summing and dividing operations, will serve to increase the signal-to-noise ratio by a factor corresponding to the square root of N (i.e., the number of summations in each pixel), with a resulting accuracy equivalent to the original 256 levels. However, in accordance with the present invention, a similar result can be achieved by detecting small changes in each image point (i.e., pixel) which would not have been resolved by conventional averaging techniques (i.e., to keep the values for each point in range, only relatively small changes in image features are monitored). In such case, even eliminating the final division (by N), the increase in signal-to-noise ratio remains the square root of N. However, values with less than one level of original resolution can nevertheless be extracted from the noisy signal, providing a "virtual" increase in resolution. The total increase in resolution is then equal to N, the number of summations involved.

As an example, let it be assumed that the actual value for a given point in an image is 4.33. Further assume that the three sequential values surrounding the image point are 4, 4 and 5 (as determined by 256 levels of image integer representation and by the existing level of noise). Following conventional averaging, i.e., (4+4+5)/3, the resultant is rounded to 4 (because integer accuracy yields no intermediate levels). Processing in accordance with the present invention (without a final division) yields a value of 13

(4+4+5), which closely corresponds to triple the actual value (4.33*3=12.99). With normally distributed noise, values obtained in this way will always approximate the true value multiplied by the number of summations, in turn providing the virtual increase in resolution that is desired.

The foregoing improvements will derive their maximum benefit when applied to applications:

1) where the source image is relatively noisy,
2) where provisions are made for subtracting image background,
3) where provisions are made for low intensity images (due to the nature of such images or the subtraction of background), and
4) where the computational facilities use integer rather than floating point arithmetic.

The presence of noise in the signal is important toward achieving efficient operation since, for noise amplitude to be effectively resolved, noise levels should exceed image accuracy by greater than one bit. The accuracy for images exhibiting negligible noise will tend not to be materially affected by the above-described imaging routines. The subtraction of background is important to permit relatively small changes in the dynamic images to be visualized, which otherwise would tend to be masked by non-homogeneities in the images. The subtraction of background also tends to decrease system requirements for visualizing images with a higher resolution, resulting from the improvements previously described. Similar accuracy can be achieved with either floating point or integer techniques. However, the disadvantage is that floating point techniques tend to introduce a dramatic decrease in speed (i.e., a decrease in speed by a factor of ten is commonly exhibited for Intel "80386" and "80486" processors), as well as a need for an increase in memory (i.e., 4 to 10 fold). As an alternative, the use of specialized hardware for floating point image processing could be used (to achieve an appropriate increase in speed for floating point processing). However, this is achievable only at a substantial increase in cost.

The imaging routine is generally comprised of the following sequence of steps. First, all required summations of appropriate values are derived for each point of the acquired image in both space and time domains, without a corresponding division by the number of summations performed. Second, steps are taken to subtract the background image, or to obtain a derivative. For a better result, the same processing in both space and time domains should be applied to the background image before the subtraction step so that noise is removed from the background image as a result of such processing. Third, steps are taken to adjust the range of the final image, if required.

Adjustment of the range of the final image will not be needed in all cases. However, where appropriate, such adjustment is accomplished by dividing obtained summations by a selected value, which will generally be less than the conventional value N. The value used to adjust the range of the final image is selected to take the present (intermediate) range and scale it down to a useful image range (e.g., a 10-bit image scaled down to an 8-bit image, by performing a division by 4). However, subtraction of the background image, or taking the derivative, will generally yield summations that are sufficiently small to avoid the need for such adjustment. Subtraction of the background can tend to decrease the range of the image to an undesirably low level. In such cases, the imaging routine can operate to increase the range, if needed for higher values of N.

A temporal filtration routine is provided for subjecting the acquired images to improved temporal filtration, as follows. Conventional temporal filtration of dynamic images proceeds according to the following equation, for N sequential images:

$$V(i)=(\Sigma I(i-N-k))/N, \qquad (16)$$

where k varies from 0 to N,
i is an index of sequential images relative to the current image (the resulting V(i) being the current averaged image to be displayed), and
I(i) is the image then received from the frame grabber or stored in the buffer.

As an example, temporal filtration in accordance with the present invention will be illustrated for the case where N=4. This is to be compared with conventional temporal filtration, which would proceed according to the following equation:

$$V(i)=(I(i)+I(i-1)+I(i-2)+I(i-3))/4. \qquad (17)$$

Computer realization of such an equation requires four memory movements and four mathematical operations (three additions and one division).

In accordance with the present invention, subsequent calculations are simplified making use of existing information, reducing the number of memory movements and mathematical operations required for such calculations. As an example, temporal filtration for the next value of N, or V(i+1), will be based upon existing parameters including I(i)+I(i-1)+I(i-2). Consequently, the calculation of subsequent values is facilitated by previously existing data. Also to be considered is that the need for a final division by N (to complete the average) can often be avoided. Temporal filtration in accordance with the present invention can therefore proceed according to the following equation:

$$V(i+1)=V(i)+I(i+1)-I(i-3). \qquad (18)$$

From this, it is seen that the determination of V(i+1) requires only an addition of the current (newest) value and a subtraction of the oldest (least recent) value derived from former calculations of V(i). This requires only two or three memory movements (two, if the previous result is stored in a CPU register) and two mathematical operations. Equation (18) is valid for any number N, and as a result, the number of memory movements and mathematical operations does not depend on N (for conventional calculations, this number is proportional to the value for N).

Conventionally available processors such as the Intel "80386" and "80486" processors generally require at least twice as much time to perform memory movements as are necessary to perform mathematical operations such as addition or subtraction. Taking this into account, the efficiency (K) of conventional temporal filtration relative to temporal filtration in accordance with the present invention can be calculated as a ratio of the time needed to perform similar results, or:

$$K=(2N+N)/(2\times 2+2)=N/2, \qquad (19)$$

where 2N represents the number of units of time required for memory movements and N represents the number of units of time required for mathematical operations. Consequently, for temporal filtration in accordance with the present invention, four time units are needed for memory movements and two time units are needed for mathematical operations (i.e., two times more efficient for N=4, 16 times more efficient for N=32, etc.).

A background routine is provided for subtracting background from the acquired images which, for a set of dynamic images, can involve the subtraction of either a previous image or a selected image in the set (for purposes of normalization). Conventional subtraction of background proceeds according to the following equation:

$$V(i)=I(i)+\text{SHIFT}-I(0), \qquad (20)$$

where V(i) is the current image after subtraction,
I(i) is the current image from the frame grabber,
I(O) is the prestored background image, and
SHIFT represents a constant added to the result of the subtraction (to visualize points), where
I(O)>I(i).

Computer realization of such an equation requires three memory movements and two mathematical operations (additions). This, in turn, requires eight time units (3×2+2).

In accordance with the present invention, subtraction of the background proceeds based upon the recognition that when temporal filtration is performed, and for each memory movement, the current result of that temporal filtration is present in a buffer (i.e., the value V(i) of equation 18). Consequently, to the contents of this buffer, the following value need be added only once:

$$N*(\text{SHIFT}-I(0)), \qquad (21)$$

which is constant for each point of the acquired image. The resulting incremental value will therefore be a constant component of all images acquired, and is advantageously introduced during initialization of the routine (for the first image in the sequence). As a result, subtraction of the background is performed automatically, on each image, without requiring even a single operation (following initialization). Instead, the desired value (SHIFT-I(O)) is introduced into equation (18), for deriving V(i). Subtraction of the background from an acquired image in accordance with the present invention is particularly advantageous when accomplished by first performing temporal filtration, and by thereafter adding the derived constant value, i.e., N*(SHIFT-I(O)), to the current value of the buffer containing V(i).

If at some point, it becomes necessary to continue processing without a subtraction of background, in order to visualize the original image, this can be accomplished by subtracting the value N*(SHIFT-I(O)) from the buffer then containing V(i).

A spatial filtration routine is provided to perform convolution on the image (in this case a flat kernel matrix of N×N elements). To this end, the absolute value for each point in the image is replaced by the derived average value (convolution with neighboring points). As an example, consider the convolution of an image element I(2,2) for the following 3×3 (N=3) matrix:

$$\begin{array}{ccc} I(1,1) & I(1,2) & I(1,3) \\ I(2,1) & I(2,2) & I(2,3) \\ I(3,1) & I(3,2) & I(3,3) \end{array} \qquad (12)$$

Conventional convolution would proceed according to the following equation:

$$\begin{aligned} V(2,2) = & (I(1,1)+I(1,2)+I(1,3)+ \\ & I(2,1)+I(2,2)+I(2,3)+ \\ & I(3,1)+I(3,2)+I(3,3))/9, \end{aligned} \qquad (23)$$

or in general form:

$$V(i,j)=(\Sigma I(k,l))/9, \qquad (24)$$

where k=i−1, . . . i+1, and
l=j−1, . . . j+1.

Computer realization of such an equation requires, for the convolution of each element, nine memory movements and nine mathematical operations (eight additions and one division), requiring 40 time units to complete (9×2+8+14). Division by an integer which is not a power of two would require 14 time units on a conventional Intel "80386" processor.

In accordance with the present invention, the spatial filtration routine is similar to the temporal filtration routine except that it is applied to columns of image data (for each point) rather than to point data. The spatial filtration routine makes use of the fact that (for a 3×3 matrix) a convolution derived for a previous point V(i,j) already includes the summation of six of the points (represented by the second and third columns of the matrix of equation 22) required for convolution of the next point. To illustrate, consider the convolution of an adjacent point, V(2,3), represented by the following matrix:

$$\begin{array}{ccc} I(1,2) & I(1,3) & I(1,4) \\ I(2,2) & I(2,3) & I(2,4) \\ I(3,2) & I(3,3) & I(3,4) \end{array} \qquad (25)$$

Correspondence between data points contained in the matrices for V(2,2) and V(2,3) is apparent from a comparison of the matrices shown as equations (22) and (25). In accordance with the present invention, the spatial filtration routine takes the result of a prior-convolution, and calculates the value for the next point using the following equation:

$$V(i,j+1)=V(i,j)+\Sigma V(k,j+1)-\Sigma V(k,j-1). \qquad (26)$$

where K=i−1, . . . i+1.

In sum, the spatial filtration routine operates to add a new column of data and to subtract the oldest column of data from the value for the current data point. Again, there is no need to divide by N as part of this routine. As a result, only six memory movements and six mathematical operations are required to achieve the desired convolution, requiring only 18 time units to complete. The resulting efficiency (K) over conventional spatial filtration for a 3×3 matrix is K=40/18, or 2.2. For an N×N matrix, efficiency is derived according to the following equation:

$$K=(2\times N\times N+N\times N-1+14)/(2\times 2N+2N)=N/2+13/6N. \qquad (27)$$

For typical values of N, the resulting efficiency (K) is 2.22 for N=3, 2.93 for N=5, and 3.8 for N=7.

The improvements of the present invention which permit acquired data to be processed in real time include not only the improved routines described above, but also result from improved sequencing of the several routines employed. To illustrate, reference is made to FIG. 2 of the drawings, which shows a comparison between the timing for processing frames of data on a conventional basis (FIG. 2A) and in accordance with the present invention (FIG. 2B), and to FIG. 3 of the drawings, which shows a flow chart for implementing the routines of the present invention.

Figure 2A:
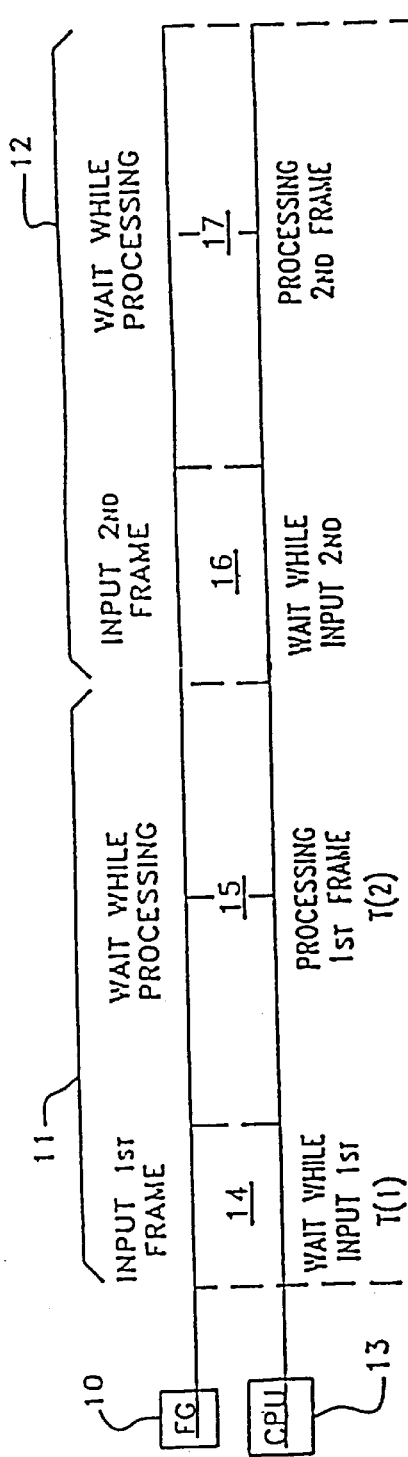
FIGS. 2A and 2B are timing diagrams comparing the acquisition of images in a conventional way with the acquisition of images in accordance with the present invention.

Conventional video processing (which forms part of the data processing system 3 of FIG. 1) employs a frame grabber 10 in communication with the video source (the image 1 of FIG. 1), for sequentially acquiring images (i.e., frames) over time. The frame grabber communicates with paired, independent frame buffers 11, 12 which are automatically switched between to receive current images. Such switching is performed by driving circuits (not shown) supplied with the frame grabber, and is regulated by a suitable control program. Referring now to FIG. 2A, the control program commences with an input 14 to a first of the two independent frame buffers, at 11, and then pauses until this operation is completed. Following this, the filled (first) buffer is accessed by the processor 13, at 15, and its contents are processed. During this period, the frame grabber 10 awaits receipt of the next video synchro-signal, which occurs at the beginning of the next frame to be acquired. This next frame 16 is then applied as an input to a second of the two independent frame buffers, at 12, which then pauses until the operation is completed. This is followed by processing of the contents of the filled, second buffer, at 17.

This process is substantially sequential in nature, and the overall processing rate is therefore defined (limited) by the time required for the input of an image plus the time required for processing of the input image (i.e., T(1)+T(2)).

Figure 2B:
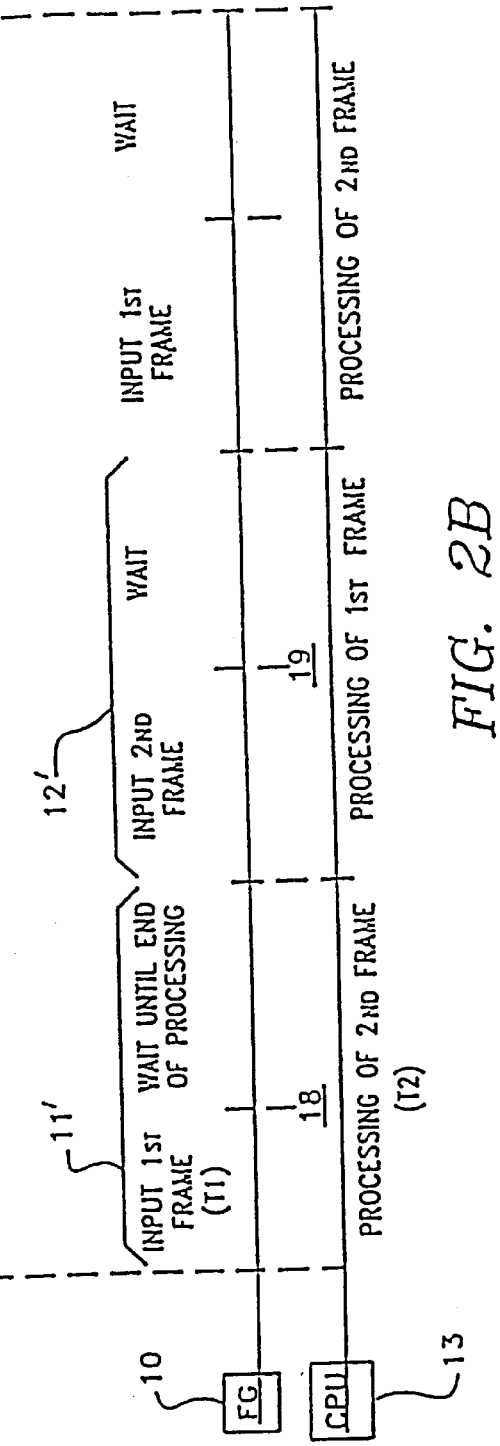

In accordance with the present invention, and referring now to FIG. 2B, image processing is accomplished during active portions of the operating cycle, which is permitted, and indeed supported by the improved speed (processing rates) afforded by the above-described processing routines. To this end, data (frame 18) present in one of the two independent frame buffers is processed while awaiting receipt of a subsequent frame for input to the current frame buffer, at 11'. During this time, the processor 13 accesses the present data (from the frame buffers 11', 12') and processes the frame stored during the previous operating cycle, while the next frame 19 is stored in the remaining frame buffer, at 12'. The processor 13 then operates upon the frame 19 while the original frame buffer 11' is filled with the next frame, and so on.

The resulting process is in part parallel, and as a result, the final image processing rate is limited only by the time required to process an acquired frame (image), or the time T(2). The resulting efficiency (K) is represented by the following equation:

$$K=(T(1)+T(2))/T(2)=1+T(1)/T(2), \tag{28}$$

where T(1) is the time required for the input of one frame and T(2) is the time required for processing the frame. For most current applications, T(1) is typically 1/60 second, and T(2) is typically 1/30 second, with a resulting efficiency (K) on the order of 1.5. Every second frame is processed and visualized at a rate of 30 frames per second. As a result, a maximum efficiency of K=2.0 can be achieved (when T(2) is equal to or less than T(1)). Because of this, the acquired images can be processed in real time, at a rate of 60 frames per second. The actual rate will be determined only by the interval T(1). In the event that the capabilities of the system are exceeded, the subsequent synchronization signal can be delayed by the video processor. However, this is generally not required due to the enhanced operating rates that can be achieved in accordance with the present invention.

Also to be considered is that among the most time consuming aspects of computer-based image processing are the program "loops" used to control repetitive processing of the two-dimensional arrays constituting each image. In addition to necessary mathematical operations and memory movements, each loop further includes at least three auxiliary operations including incrementing the point index counter, comparing the current point index to the permitted maximum value, and jumping to the beginning of the loop. For conventional Intel "80386" processors, these operations will generally require at least 11 time units (2+2+7). This number of auxiliary operations (per point) is comparable to the number of operations required for temporal filtration (6 units) and spatial filtration (18 units), as previously described, representing a significant portion of the overall image processing routine.

Figure 3:
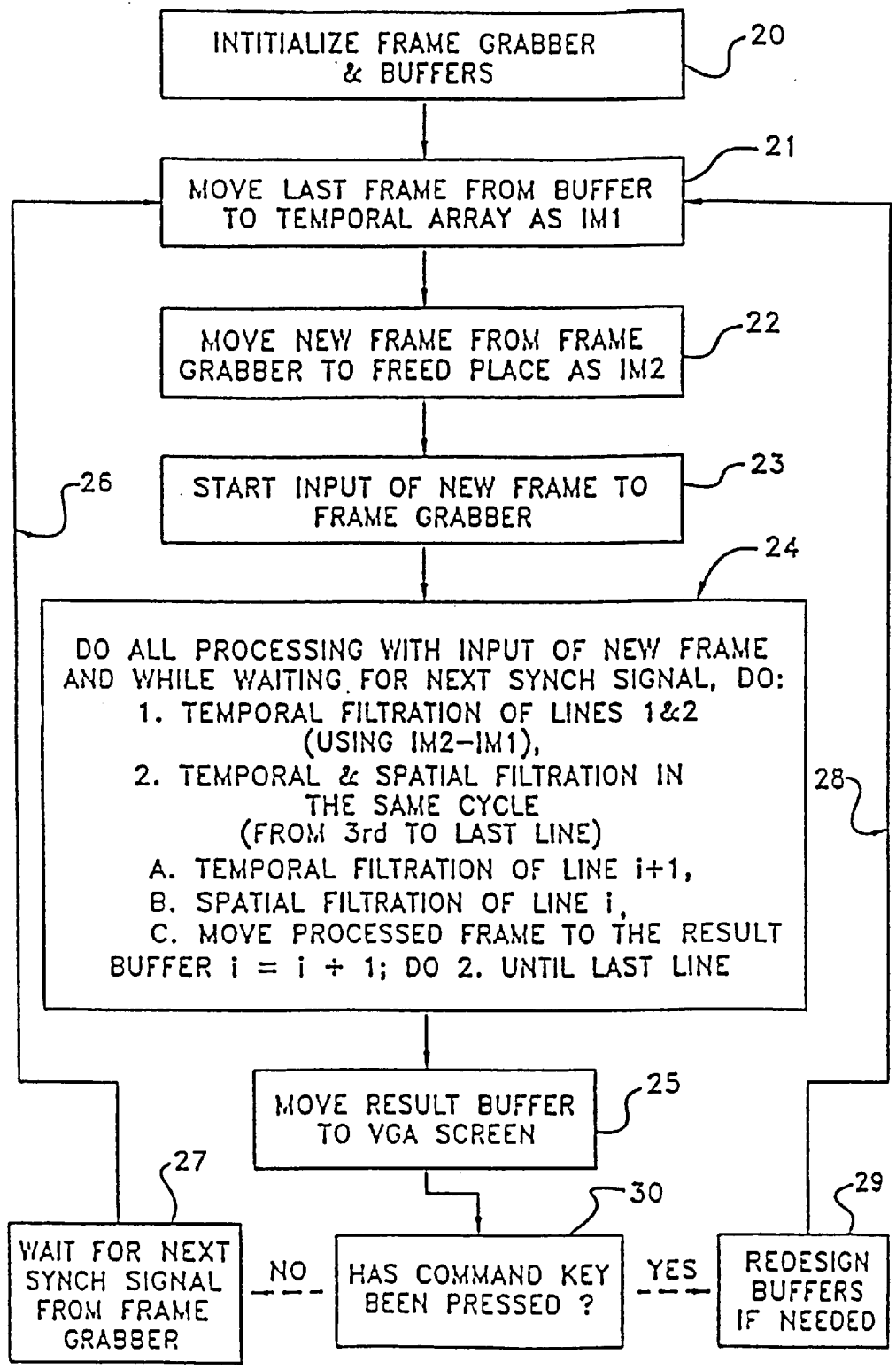
FIG. 3 is a flow chart illustrating the acquisition and processing of data representative of acquired images, in accordance with the present invention.

In accordance with the present invention, and referring now to FIG. 3 of the drawings, it has been found that the total number of looping operations can be decreased by combining temporal filtration, spatial filtration, and movement of the newly input image to the buffer in the same loop. To this end, the frame grabber (reference 10 in FIG. 2) and the frame buffers (references 11, 12 in FIG. 2) are initialized, at 20. As the buffers are filled, the last frame to be acquired is moved from the appropriate frame buffer (e.g., the buffer 11) to a temporal array IM1, at 21. The next frame to be acquired is moved from the appropriate frame buffer (e.g., the buffer 12) to a freed array IM2, at 22, and a new frame is introduced to the frame grabber 10, at 23. Steps are then taken to process the resulting data, at 24, all of which takes place in a single loop (i.e., note the loop returns 26, 28).

During initialization, such processing includes a conventional temporal filtration of the first two lines of data (using the difference IM1−IM2). For the third to the last line of data, such processing includes a temporal filtration of the line (i+1), a spatial filtration of the line (i), and a movement of the processed frame to the resultant buffer. The line number (i) is incremented, and the combined processing at 24 is completed.

Following processing, at 24, the resultant buffer is moved to an appropriate transducer (e.g., a VGA screen) for displaying or otherwise making use of the processed data, at 25. If continued processing is in order, processing returns to the acquisition portions of the defined loop, at 26, responsive to the next synchronization signal received from the frame grabber 10 (detected at 27). If a reconfiguration of the frame buffers 11, 12 is needed (e.g., to receive a different image), processing returns to the acquisition portions of the defined loop, at 28. In such case, reconfiguration of the buffers is enabled, at 29, responsive to the actuation of a command key for implementing such a result, at 30. Note, only a single loop is defined in either case.

Conventional processing implements temporal filtration and spatial filtration in different loops since the result of the temporal filtration will serve as the input for the spatial filtration, and must therefore be calculated in advance. This is because for each given point in an image, conventional routines must acquire data from both a previous line and a subsequent line (e.g., for N=3, see equation 23). In contrast, for processing in accordance with the present invention, only the first two lines of an image must be subjected to temporal filtration in a separate loop (i.e., as an initialization). Thereafter, for processing of the third to the last line of the acquired image, both temporal filtration and spatial filtration are performed in the same (main) loop by first operating upon the next line with temporal filtration and by then using the previously calculated (in this case three) lines for spatial filtration of the current line. The resulting efficiency (K) of such processing is represented by the following equation:

$$K(2*X*Y*n)/((N-1)*X*n+(Y-N+1)*X*n)=2, \tag{29}$$

where X and Y represent the number of horizontal and vertical points in the image,
N=the size of the matrix for spatial filtration,
n=the number of auxiliary loop operations for each point, and
2=the coefficient for performing auxiliary operations in two separate loops.

The efficiency of the foregoing does not depend on either the size of the image to be acquired or the spatial filtration matrix that is established. In each case, the efficiency of processing the temporal filtration and the spatial filtration in the same loop is always K=2.

As an indication of overall efficiency and improved processing rates, the total number of time units required to process images in accordance with the present invention can be calculated. This includes the number of time units for temporal filtration, subtraction of background, spatial filtration and auxiliary loop operations, respectively. For processing in the conventional way, with division on powers of two numbers, the result is:

$$N1=(8+4)+(6+2)+(18+9)+(22)=69. \qquad (30)$$

For conventional processing with division by an auxiliary integer, the result is:

$$N2=(8+3+14)+(6+2)+(18+8+14)+(22)=95. \qquad (31)$$

For processing in accordance with the present invention, the result is:

$$N3=(4+2)+(0)+(12+6)+(11)=35. \qquad (32)$$

These numbers are characteristic of temporal filtration (for N=4), and a spatial filtration of a 3×3 matrix. The resulting efficiency (K) of such processing is 1.97 to 2.71.

Generally, the savings in the number of computer operations required for image processing in accordance with the present invention is:

$$S=X*Y*F*n \qquad (33)$$

where X and Y represent the size of the image,
F=the required frame rate, and
n=the number of operations saved.

For a characteristic image of 128×80 pixels at 30 frames per second and for n=34, this results in a savings (S) of 10.2 Mop/s (millions of operations per second). Increasing the value of n to n=60 results in a savings (S) of 18.0 Mop/s. These parameters represent the number of computer operations forming part of the image processing task which can be eliminated in accordance with the present invention.

Further illustration of the improvements which are achievable is evident from a comparison of overall performance data obtained with and without such improvements. FIG. 4 shows a table which compares performance for various 16-bit processor boards including three currently available devices, and two separate implementations of the system of the present invention (Product 501MM is a software-based product implemented with an Intel "140486/66" processor; Product 1001MD is a projected, hardware-based product for implementing similar improvements). From this table, significant improvements are apparent in individual performance, and in particular, in combination.

As a practical demonstration of the foregoing, in a test apparatus, a general purpose frame grabber (Control Vision Model CV-512) was coupled with an Intel "80486/66" processor to process video images in real time. To this end, images of 128×80 pixels were digitized and transferred to images (as arrays of 256×80 pixels) from the frame grabber to the memory, where the images were compressed to 128×80 by averaging every two adjacent pixels on each line. Following a subtraction of background (prestored image) from each image, temporal frame averaging (2,4,8,16,32 images) in a flat kernel matrix (or a pyramidal matrix; 1, 2, 3, 2, 1), and spatial convolution as a 3×3 flat kernel matrix was performed. The resulting images were displayed on a VGA screen with a resolution of 128×80 (or zooming images to 256×160 displayed on a SVGA screen). All of the above functions, combined, were performed in less than 33 ms/frame (30 frames/second). The same test apparatus was used to process video images of 256×160 pixels. The images were digitized and transferred from the frame grabber to the main memory, followed by a subtraction of background (prestored image) from each image. Temporal frame averaging (2, 4, 8 images) in a flat kernel matrix, and spatial convolution in a 3×3 flat kernel matrix were then performed. The resulting images were displayed on a SVGA screen (256×160 pixels). All of the above functions, combined, were performed in less than 40 ms/frame (25 frames/second).

The following tables illustrate, quantitatively, the improvements in image processing which are achievable in accordance with the present invention. For example, in implementing the above-described routines, the following enhancements in processing speed have been demonstrated with an Intel "40486" processor.

TABLE 3

Speed of Processing

1. Convolution using a flat kernel matrix on images of 256×160 pixels . . . 9 ms
2. Convolution using a pyramidal matrix on images of 256×160 pixels . . . 15 ms
3. Temporal frame averaging using a flat kernel matrix (N=2,4,8,16,32) on images of 256×160 pixels . . . 4 ms
4. Temporal frame averaging with pyramidal kernel matrices (1,2,3,2,1); (1,2,3,4,3,2,1); (1,2,3,4,5,4,3,2,1) . . . 7 ms
5. Subtraction of background for the first image in a sequence . . . 2.5 ms for every next image . . . 0 ms With the same processor, the following results were obtained to demonstrate the computational efficiency achieved in reducing the number of operations per pixel during the performance of various image processing tasks.

TABLE 4

Convolution with a Flat Kernel Matrix for an Image of 256 × 160 Pixels

| | Operations/Pixel | | |
|---|---|---|---|
| Size of Matrix | Conventional | Present Invention | Efficiency |
| 3 × 3 | 9 | 4 | 2.25 |
| 5 × 5 | 25 | 4 | 6.25 |
| 7 × 7 | 49 | 4 | 12.25 |

TABLE 5

Convolution with a Pyramidal Kernel Matrix for an Image of 256 × 160 Pixels

| | Operations/Pixel | | |
|---|---|---|---|
| Size of Matrix | Conventional | Present Invention | Efficiency |
| 3 × 3 | 15 | 8 | 1.85 |
| 5 × 5 | 56 | 8 | 7.0 |

TABLE 6

Temporal averaging of Images of 256 × 160 Pixels
With a Flat Kernel Matrix

| Number of | Operations/Pixel | | |
|---|---|---|---|
| Images to Avg. | Conventional | Present Invention | Efficiency |
| 4 | 4 | 2 | 2.0 |
| 8 | 8 | 2 | 4.0 |
| 16 | 16 | 2 | 8.0 |

TABLE 7

Temporal Averaging of Images of 256 × 160 Pixels
With a Pyramidal Kernel Matrix

| Number of | Operations/Pixel | | |
|---|---|---|---|
| Images to Avg. | Conventional | Present Invention | Efficiency |
| 5 (1,2,3,2,1) | 9 | 4 | 2.25 |
| 7 (1,2,3,4,3,2,1) | 14 | 4 | 3.50 |

Any of a variety of applications will benefit from the improvements of the present invention. However, one such application which warrants special consideration is the enhancement of image compression/decompression routines, which not only represents a potential application for the foregoing improvements, but which also provides an improved routine for facilitating still other practical applications. Generally speaking, existing image compression/decompression (CODEC) routines will benefit from the ability of the image processing routines of the present invention to restore an image from noise.

To this end, and in accordance with the present invention, steps are first taken to add a specified level of noise (i.e., a predetermined matrix of random noise or pseudonoise, generated by a repeated pattern in a dithering matrix) to the image to be subjected to compression. The amplitude of the noise needed for such purposes is determined by a division factor (N) dependent upon the level of compression to be achieved, and responsive to the requirement that the maximum value of such noise after the division by N should be approximately 1.0 to 1.3 units of intensity.

The image with the added noise is then divided by the division factor N (e.g., 8, 16, 32, 128 . . . ). As a result, the original image (e.g., with an 8-bit accuracy) will be converted to an image with a reduced number of bits/pixel (e.g., with five bits, four bits, three bits, two bits or one bit per pixel). The resulting image is made highly compressible by such processing.

Finally, the resulting image is compressed in plural stages by squeezing adjacent bytes to remove all bits set to zero in each pixel, by division. As a result, the primary compression will be 8, 4, 2, for the accuracy of the resulting image (1-bit, 2-bit, 4-bit). In the event that further compression is needed, known and conventional compression techniques can be applied to the resultant. This can include run length encoding (RLE) compression, substituting sets of repetitive bytes by values of the byte and counts of the same byte in the set, or LZW (Lempel, Ziv, Welch) compression.

The number of operations required to implement the foregoing compression routine includes one operation per pixel for the addition step, one operation per pixel for the subsequent division, and about two operations per pixel for the squeezing of adjacent bytes. The number of operations per pixel for RLE and LZW secondary compression is significantly greater than one. However, the total number of pixels to be processed will be much less (e.g., 2, 4 or 8 times) following primary compression. As a result, for compression ratios up to eight, the total number of operations per pixel is 4. Applied to a conventional Intel "180486/66" processor, compression speeds of 5 ms/frame have been obtained in the compression of an 8-bit video image comprised of 256×160 pixels.

Decompression of the images is similarly accomplished. First, the image is decompressed using conventional decompression routines in inverse order (e.g., LZW, RLE, if used). Each pixel is then expanded (e.g., to 8 bytes) by setting higher bits to zero (in opposite manner to squeezing of the images during compression). Finally, convolution is performed (without division) in a kernel matrix (e.g., 3×3, 4×4 or 5×5, depending on the desired final resolution for the uncompressed image). The total number of operations required for decompression is 6, including two operations per pixel for an expansion to eight bytes, and four operations per pixel to perform convolution. Applied to a conventional Intel "80486/66" processor, compression speeds of 13 ms/frame have been obtained in the decompression of an 8-bit video image comprised of 256×160 pixels.

The above-described improvements are useful in enhancing the digital processing of N-dimensional arrays (matrices) obtainable by a variety of hardware/software oriented technologies, and from a variety of sources. Because the processing routines of the present invention are not confined by the spectral or dimensional characteristics of the source signal, or by the characteristics of the signal acquisition hardware that is used, the above-described routines have application wherever digital signal processing plays a role including, but in no way limited to the sciences, medicine, industry, telecommunications, commerce and entertainment. Additional advantage results from the ability of the above-described processing routines to address and solve problems common to signal processing in various fields of application including problems related to cost, time and power requirements, as well as the need for higher resolution and lower risk, particularly in medical applications.

Consequently, the improvements of the present invention will find utility in a variety of signal processing applications, including applications which can be broadly characterized in a first class as the processing of noisy acoustic signals, and in a second class as the processing of both static and dynamic (video) two-dimensional images. In the latter classification, particular utility is found in the emerging multimedia telecommunications field, in teleconferencing, and in interactive video. Other signal processing applications where the improvements of the present invention will find applicability include surveillance and security applications, including those involving two-dimensional, low-light and infrared image processing. As a practical demonstration of this, a commercially available CCD video camera was used to obtain dynamic images at low light levels (e.g., for surveillance). The images were obtained in ambient light sufficiently dim to reduce the accuracy of image representation from 8-bit, 256 gray levels, to 3- to 5-bit, 8 to 32 gray levels. These images were then restored to 8-bit, 256 gray levels, yielding an improvement in resolution of 10 to 30 times. Applications of infrared image processing would include emergent uses in the remote monitoring of physiological parameters, such as in clinical and research applications. Also included are applications such as medical imaging (MRI, PET, ultrasound), and industrial imaging (robot vision, machine vision, motion detection and non-destructive testing). All such applications are enhanced by the improved resolution, speed and compressibility which are achievable with the processing routines of the present invention. In general, improvements in sensitivity on the order of 10 to 30 times are achievable for static images, and improvements in sensitivity on the order of 10 to 100 times are achievable for dynamic (video) images.

Yet another application which derives from the improvements of the present invention, which has been practically demonstrated, is the enhancement of X-ray images employing a commercially available CCD video camera and X-ray films of normal quality as static images. To simulate a decrease of X-radiation, the diaphragm of the CCD camera was closed down (reducing image intensity 10 to 25 times, and representing a decrease in resolution from 256 gray levels to 10 to 25 levels). Steps were then taken to restore the digitized X-ray image to 256 levels of gray, representing an improvement in resolution of 10 to 25 times (with a convolution of 3×3 and 5×5 matrices, respectively).

A significant application suited to the improvements of the present invention involves the implementation of real time, high resolution, infrared imaging. It has been found that by combining the improvements of the present invention with commercially available infrared video cameras (e.g., Inframetrics IR cameras including Models 522L, 760L and Infracam), one can resolve spatially distributed temperature changes of as little as 0.001° C., representing a significant (i.e., 10 to 100 fold) increase in sensitivity from the values typically achievable using prior techniques (typically on the order of 0.1° C.). In connection with the display and the recording of images, such resolution can be achieved in real time at rates on the order of 30 frames per second, or more. Such improvement gives rise to a variety of practical applications, all of which are uniquely capable of providing clinical medicine with the much needed ability to effect continuous, real time monitoring of rapid changes in patterns of temperature and microcirculation at the skin surface in humans and animals. Previously, and in contrast, neither clinical medicine nor the pharmaceutical industry had at its disposal a comparable real time monitoring capability. Among the significant applications of such a capability is the measurement of the comparative physiological response to various pharmaceutical agents. These applications include the monitoring of response to therapeutic agents for arthritis, for circulatory problems such as Raynaud's syndrome, and for a variety of ANS and CNS disturbances reflected by anomalies in surface hemodynamics and their accompanying temperature patterns. As a practical demonstration of the foregoing, commercially available infrared video cameras were employed in pharmaceutical drug trials, to demonstrate the advantages of the increased sensitivity of the processing routines of the present invention in monitoring brain blood flow and metabolic response to pharmaceutical agents in laboratory rats. The applications examined included the induction of epileptiform activity, using topical application of penicillin crystals, and changes in levels of narcosis following administration of agents such as Nembutal and Phenobarbital. In such applications, the temporal and spatial improvement of the present invention permits real time observation of continuous changes in cortical response to the administered agents, as well as an increase in temperature resolution of from 10 to 100 times in comparison with previous capabilities.

Similarly, the foregoing improvements make possible the high resolution (0.001° C.), noncontact monitoring of continuously distributed surface temperature patterns, in contrast to temperature measures derived from one or more contact points. This combination of capabilities provides a new basis for effective biofeedback therapy for a variety of disorders involving circulatory and temperature imbalances (e.g., Raynaud's disease, migraine). In this context, therapeutic effectiveness is also enhanced by the capability afforded by the present invention for providing all of the above advantages in real time, a capability which is of particular importance in biofeedback.

Of corresponding importance is the ability to remotely (without contact) monitor a subject with available infrared video equipment, which is again made feasible only with the real time, high resolution monitoring capabilities of the present invention. The following is provided as a non-limiting indication of examples of applications of such technology to the continuous monitoring of endogenous temperature and micro-circulatory change.

One such example is the monitoring of brain temperature during hypothermically-assisted cardiac surgery. In this application, continuous remote, contactless, high resolution monitoring of brain surface temperature (which in the interests of full cortical recovery cannot be allowed to rise above a prescribed level) is permitted. Previously, the only available means for accomplishing such a function was the use of thermistor probes, which had to be attached directly to tissue surface. In addition to the inconvenience and medical hazard of direct contact probes, the connecting leads had the potential for interfering with the surgical task. Further, each thermistor was capable of providing a temperature measurement only for that tissue with which it was in direct contact. In contrast, the improvements of the present invention provide a high resolution image of the entire cranial surface and, in a practical demonstration with commercially available infrared cameras involving the processing of images obtained from the brains of piglet models during cardiac surgery, exhibited a 10 to 20 fold increase in sensitivity in comparison to non-processed images.

Yet another example is the continuous, remote monitoring of physiological parameters in critical care and extended care facilities. Through the monitoring of high resolution, infrared images of the body surface, the remote, non-intrusive access to a variety of critically important physiological parameters can be derived in accordance with the present invention, at virtually any level of ambient light (including complete darkness). Among these measures are facial and limb behaviors, respiration, heart rate and cranial temperature and/or microcirculatory patterns. Preliminary studies have shown the latter phenomenon to reflect differences in physiological states such as feeding and sleeping. The study of other phenomena is expected to similarly benefit from such improvements including the non-contact imaging of melanomas and the like, non-contact physiopychological monitoring in infancy, and real time infrared video monitoring in rheumatoid arthritis, as well as the potential application of such techniques to a variety of testing procedures including laparoscopy, computer assisted imaging of hard and soft tissues, and other surgical assistance modes. As a practical demonstration of the foregoing, commercially available infrared video cameras were used to monitor infant breathing rates in intensive care conditions. The cameras were situated at a distance from the infants to monitor the temperature change in expired air at the nares. The result was an increase in the sensitivity limitations of the cameras from 0.1° C. to as much as 0.01° C. to 0.005° C., or an increase in sensitivity of from 10 to 20.

Also made possible are a variety of non-medical applications. This would include applications such as nondestructive testing in various industrial fields, the monitoring of patterns emitted from defective junctions and components in printed circuit boards and integrated circuits while under load, amplification of infrared inspection microscope systems to make previously unobtainable images useful in quality control during printed circuit board and integrated circuit manufacture, and to monitor the so-called "burn in" stage in the manufacture of various electronic assemblies through the continuous monitoring of deviations from normal thermal patterns of operation. Other applications will be apparent to the person of ordinary skill in this art, including both existing applications as well as applications not yet devised.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. A computer-implemented method for processing a matrix of data values, the method comprising the steps of:
   (a) identifying an input signal;
   (b) converting said input signal to a matrix of data values;
   (c) processing said matrix of data values by;
      (1) storing the data values in a computer-readable memory, wherein the data values are representative of physical objects or activities;
      (2) applying a function to a first kernel of data values of the matrix adjacent to a first data value of the matrix to generate a first output value; and
      (3) applying the function to a second kernel of data values of the matrix adjacent to a second data value of the matrix to generate a second output value by performing the steps of:
         (i) adding to the first data value a first differential value to generate an intermediate value, the first differential value corresponding to data values of the second kernel that are not in the first kernel; and
         (ii) subtracting from the intermediate value a second differential value to generate the second output value, the second differential value corresponding to data values of the first kernel that are not in the second kernel,
   (d) converting the output data values to a signal having a higher signal-to-noise ratio than said input signal.

2. The computer-implemented method of claim 1, wherein the data values are pixels and the matrix of data values is a matrix of pixels representative of an image.

3. The computer-implemented method of claim 2, wherein the image is one of a video image, an infrared image, a magnetic image, an X-ray image, and an acoustic image.

4. The computer-implemented method of claim 1, wherein the function is defined by a summation of data values of the kernel of data values to which the function is applied.

5. The method of claim 4, further comprising the step of storing the second output value without dividing by the number of data values of the second kernel.

6. The computer-implemented method of claim 1, wherein the function is defined by a summation of terms, the terms comprising respective function coefficients times each data value of the kernel to which the function is applied.

7. The computer-implemented method of claim 1, wherein the function is a convolution function.

8. The computer-implemented method of claim 7, wherein:

the matrix is an n-dimensional matrix, where n>1;

the convolution function is a one-dimensional convolution function; and the convolution function is a non-weighted convolution function;

the method further comprising the step of convoluting the n-dimensional matrix by performing n one-dimensional convolutions, one in each dimension, wherein each successive convolution is based upon an immediately preceding convolution.

9. A computer-readable medium having stored thereon a plurality of instructions which, when executed by a processor, cause the processor to perform the steps of:
   (a) identifying an input signal;
   (b) converting said input signal to a matrix of data values;
   (c) storing the data values in a computer-readable memory, wherein the data values are representative of physical objects or activities;
   (d) processing said matrix of data values by:
      (1) applying a function to a first kernel of data values of the matrix adjacent to a first data value of the matrix to generate a first output value; and
      (2) applying the function to a second kernel of data values of the matrix adjacent to a second data value of the matrix to generate a second output value by performing the steps of:
         (i) adding to the first data value a first differential value to generate an intermediate value, the first differential value corresponding to data values of the second kernel that are not in the first kernel; and
         (ii) subtracting from the intermediate value a second differential value to generate the second output value, the second differential value corresponding to data values of the first kernel that are not in the second kernel,
   (e) converting the output data values to a signal having a higher signal-to-noise ratio than said input signal.

10. The computer-readable medium of claim 9, wherein the data values are pixels and the matrix of data values is a matrix of pixels representative of an image.

11. The computer-readable medium of claim 10, wherein the image is one of a video image, an infrared image, a magnetic image, an X-ray image, and an acoustic image.

12. An apparatus for processing a matrix of data values, the apparatus comprising:
   (a) means for identifying an input signal;
   (b) means for converting said input signal to a matrix of data values;
   (c) a computer-readable memory for storing the data values, wherein the data values are representative of physical objects or activities;
   (d) means for processing said matrix of data values including:
      (i) means for applying a function to a first kernel of data values of the matrix adjacent to a first data value of the matrix to generate a first output value; and
      (ii) means for applying the function to a second kernel of data values of the matrix adjacent to a second data value of the matrix to generate a second output value, including:
         (A) means for adding to the first data value a first differential value to generate an intermediate value, the first differential value corresponding to data values of the second kernel that are not in the first kernel; and (B) means for subtracting from the intermediate value a second differential value to generate the second output value, the second differential value corresponding to data values of the first kernel that are not in the second kernel, (e) means for converting the output data values to a signal having a higher signal-to-noise ratio than said input signal.

13. The apparatus of claim 12, wherein the data values are pixels and the matrix of data values is a matrix of pixels representative of an image.

14. The apparatus of claim 13, wherein the image is one of a video image, an infrared image, a magnetic image, an X-ray image, and an acoustic image.

15. The apparatus of claim 12, wherein the function is defined by a summation of data values of the kernel of data values to which the function is applied.

16. The apparatus of claim 15, further comprising the means for storing the second output value without dividing by the number of data values of the second kernel.

17. The apparatus of claim 12, wherein the function is defined by a summation of terms, the terms comprising respective function coefficients times each data value of the kernel to which the function is applied.

18. The apparatus of claim 12, wherein the function is a convolution function.

19. The apparatus of claim 18, wherein:

the matrix is an n-dimensional matrix, where n>1;

the convolution function is a one-dimensional convolution function; and the convolution function is a non-weighted convolution function;

the apparatus further comprising means for convoluting the n-dimensional matrix by performing n one-dimensional convolutions, one in each dimension, wherein each successive convolution is based upon an immediately preceding convolution.

20. A computer-implemented method for processing a matrix of data values, the method comprising the steps of:

(a) identifying an input signal;

(b) converting said input signal to a matrix of data values;

(c) storing the data values in a computer-readable memory, wherein the data values are representative of physical objects or activities;

(d) processing said matrix of data values by:

(1) comparing a first data value of the matrix with each of a plurality of data values adjacent in the matrix to the first data value;

(2) if the first data value is a maximum with respect to the plurality of data values in accordance with the comparison of step (1) then repeatedly subtracting a first incremental value from the first data value until the first data value is not a maximum with respect to the plurality of data values; and (3) if the first data value is a minimum with respect to the plurality of data values in accordance with the comparison of step (1) then repeatedly adding a second incremental value to the first data value until the first data value is not a minimum with respect to the plurality of data values, (e) converting the output data values to a signal having a higher signal-to-noise ratio than said input signal.

21. The computer-implemented method of claim 20, wherein the data values are pixels and the matrix of data values is a matrix of pixels representative of an image.

22. The computer-implemented method of claim 21, wherein the image is one of a video image, an infrared image, a magnetic image, an X-ray image, and an acoustic image.

23. The computer-implemented method of claim 20, wherein the matrix is a two-dimensional matrix.

24. The computer-implemented method of claim 20, wherein the plurality of data values are directly adjacent in the matrix to the first data value.

25. The computer-implemented method of claim 20, wherein the first incremental value is equal to the second incremental value.

26. The computer-implemented method of claim 20, wherein each data value has a value range from 1 to N and the first and second incremental values are 1.

27. A method for accelerating the processing of data in a data processor comprising the steps of:

(a) acquiring a signal from a transducer and converting said signal to data values and storing said data values in a memory as elements in a data matrix, wherein each of the elements in the data matrix is related to each of the other elements in the data matrix, (b) processing the data values by:

(1) performing a mathematical operation on a first element in the data matrix as a function of the adjacent elements in the data matrix $F( \ldots, I(i), \ldots )$ to derive a calculated value $V(i)$;

(2) replacing the first element in the data matrix with the calculated value $V(i)$;

(3) performing a mathematical operation on an adjacent element in the data matrix to obtain a calculated value $V(i+1)$ for the adjacent element, wherein the calculated value of the adjacent element $V(i+1)$ is equal to the calculated value for the first element $V(i)$ plus the difference $\Delta F(i)$ of the function performed on the first element $F( \ldots, I(i), \ldots )$ and the same function performed on the adjacent element $F( \ldots, I(i+1), \ldots )$;

(4) replacing the adjacent element with its calculated value $V(i+1)$ in the data matrix;

(5) repeating steps (1)–(3) for successive elements in the data matrix; and (c) converting said data to the acquired signal having a higher signal-to-noise ratio to perform useful work.

28. The method of claim 27, wherein the mathematical operation comprises a summation of the data values and the data matrix.

29. The method of claim 27, wherein the mathematical operation is a convolution function.

30. The method of claim 29, wherein:

(a) the data matrix is an n-dimensional matrix, wherein n>1;

(b) the convolution function is a one-dimensional convolution function;

(c) the convolution function is a non-weighted convolution function; and (d) the data matrix is convoluted by performing an one-dimensional convolution, one in each dimension, wherein each successive convolution is based upon the immediate proceeding convolution.

31. An apparatus for accelerating the processing of data in a data processor comprising:

(a) means for acquiring a signal from a transducer;

(b) means for converting the acquired signal to data values;

(c) a memory for storing said data values as elements in a data matrix, wherein each of the elements in the data matrix is related to each of the other elements in the data matrix; and (d) a data processor programmed to:
(1) perform a mathematical operation on a first element in the data matrix as a function of the adjacent elements in the data matrix $F(\ldots, I(i), \ldots)$ to derive a calculated value $V(i)$;
(2) replace the first element in the data matrix with the calculated value $V(i)$;
(3) perform a mathematical operation on an adjacent element in the data matrix to obtain a calculated value $V(i+1)$ for the adjacent element, wherein the calculated value of the adjacent element $V(i+1)$ is equal to the calculated value for the first element $V(i)$ plus the difference $\Delta F(i)$ of the function performed on the first element $F(\ldots, I(i), \ldots)$ and the same function performed on the adjacent element $F(\ldots, I(i+1), \ldots)$;
(4) replace the adjacent element with its calculated value $V(i+1)$ in the data matrix; and (f) means for receiving data from said data processor and converting said data to the acquired signal having a higher signal-to-noise ratio.

32. A method for accelerating the processing of data in a data processor comprising the steps of:
(a) acquiring a signal from a transducer;
(b) converting said signal to data values;
(c) storing said data values in a memory as elements in a data matrix, wherein each of the elements in the data matrix is related to each of the other elements in the data matrix;
(d) comparing a first element in the data matrix with each element adjacent to the first element;
(e) processing the first element in accordance with the following conditions:
(1) if the first element is a maximum with respect to each adjacent element, then repeatedly subtracting a first incremental value dV from the first element until the first element is less than at least one of the adjacent elements,
(2) if the first element is a minimum with respect to each adjacent element, then repeatedly adding a second incremental value dV to the first element until the first element is greater than at least one of the adjacent elements,
(3) if the first element is equal to the value of each of the adjacent pixels, or if the first element is not a maximum and is not a minimum with respect to each adjacent element, then the first element is left unchanged,
(f) processing the elements in the matrix in accordance with steps (d) and (e) above; and (g) passing the data to another transducer or said transducer to perform useful work.

33. The method of claim 32, wherein the data matrix is a two-dimensional matrix.

34. The method of claim 32, wherein the first and second incremental values are equal.

35. The method of claim 32, wherein each element has a value from 1 to N and the first and second incremental values are 1.

36. An apparatus for accelerating the processing of data in a data processor comprising:
(a) means for acquiring a signal from a transducer;
(b) means for converting the acquired signal to data values;
(c) a memory for storing said data values as elements in a data matrix, wherein each of the elements in the data matrix is related to each of the other elements in the data matrix; and
(d) a data processor programmed to:
(1) compare a first element in the data matrix with each element adjacent to the first element;
(2) process the first element in accordance with the following conditions:
(i) if the first element is a maximum with respect to each adjacent element, then repeatedly subtracting a first incremental value dV from the first element until the first element is less than at least one of the adjacent elements,
(ii) if the first element is a minimum with respect to each adjacent element, then repeatedly adding a second incremental value dV to the first element until the first element is greater than at least one of the adjacent elements,
(iii) if the first element is equal to the value of each of the adjacent pixels, or if the first element is not a maximum and is not a minimum with respect to each adjacent element, then the first element is left unchanged,
(3) process all of the elements in the matrix in accordance with steps (1) and (2) above;
(4) produce an output signal having a higher signal-to-noise ratio than said acquired signal; and
(5) pass the data to another transducer or said transducer to perform useful work.

37. The method of claims 27 or 32, wherein the elements are pixels and the data matrix is a matrix of pixels representative of an image.

38. The method of claim 37, wherein the image is one of a video image, an infrared image, an X-ray image, and an acoustic image.

* * * * *

UNITED STATES PATENT AND TRADEMARK OFFICE
CERTIFICATE OF CORRECTION

PATENT NO. : 5,881,178
DATED : March 9, 1999
INVENTOR(S) : Tsykalov et al.

It is certified that error appears in the above-identified patent and that said Letters Patent is hereby corrected as shown below:

On the Title page at [57] in the Abstract, at line 2, please change "accelerted" to --accelerated--.

In Column 7, at line 3, please change "N=" to --N=32--; and at line 5, please change "tow" to --two--.

In Column 8, at approximately line 30 at equation 14, please change "(4)" to --(14)--.

In Column 10, at line 35, before "indicates" please insert --i--.

In Column 11, at line 50, please change "AMCA" to --AICA--.

In Column 15, at approximately line 55, please change "(12)" to --(22)--.

UNITED STATES PATENT AND TRADEMARK OFFICE
CERTIFICATE OF CORRECTION

PATENT NO. : 5,881,178
DATED : March 9, 1999
INVENTOR(S) : Tsykalov et al.

It is certified that error appears in the above-identified patent and that said Letters Patent is hereby corrected as shown below:

In Column 16, at line 30, please change "prior-convolution" to --prior convolution--.

In Column 19, at line 51, please change " "140486/" to --"40486/--.

In Column 22, at line 5, please change " "180486/66" " to --"80486/66"--.

Signed and Sealed this

Twenty-eighth Day of December, 1999

Attest:

Q. TODD DICKINSON

Attesting Officer

Acting Commissioner of Patents and Trademarks